United States Patent
Ehrich et al.

(10) Patent No.: US 9,138,672 B2
(45) Date of Patent: Sep. 22, 2015

(54) MODIFIED FLUIDIZING PLATE FOR USE IN GASIFICATION PLANTS WITH DRY FUEL FEED

(71) Applicants: Ronny Ehrich, Freiberg (DE); Stefanie Henker, Weißenborn (DE); Frank Kirsch, Freiberg (DE); Jürgen Noack, Dresden (DE)

(72) Inventors: Ronny Ehrich, Freiberg (DE); Stefanie Henker, Weißenborn (DE); Frank Kirsch, Freiberg (DE); Jürgen Noack, Dresden (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 0 days.

(21) Appl. No.: 14/019,682

(22) Filed: Sep. 6, 2013

(65) Prior Publication Data

US 2014/0069069 A1    Mar. 13, 2014

(30) Foreign Application Priority Data

Sep. 11, 2012  (DE) .......................... 10 2012 216 084

(51) Int. Cl.
*B01D 46/00* (2006.01)
*B01D 46/10* (2006.01)

(52) U.S. Cl.
CPC ............ *B01D 46/0002* (2013.01); *B01D 46/10* (2013.01); *B01D 2265/06* (2013.01)

(58) Field of Classification Search
CPC ........ B01D 46/02; B01D 46/04; B01D 46/06; B01D 46/10; B01D 46/75; B01D 46/2411

USPC ............................ 55/473, 495, 498, 524, 528
See application file for complete search history.

(56) References Cited

U.S. PATENT DOCUMENTS

| 4,338,878 A * | 7/1982 | Mason et al. ................. 118/429 |
| 5,505,892 A * | 4/1996 | Domme ....................... 264/29.6 |
| 5,702,494 A * | 12/1997 | Tompkins et al. .............. 55/498 |
| 2004/0074836 A1* | 4/2004 | Long ............................. 210/435 |
| 2014/0069070 A1* | 3/2014 | Ehrich et al. .................... 55/495 |

FOREIGN PATENT DOCUMENTS

| CN | 2061863 U | 9/1990 |
| CN | 2097691 U | 3/1992 |
| CN | 101346178 A | 1/2009 |
| CN | 102042587 A | 5/2011 |
| WO | WO 2006015778 A1 | 2/2006 |

OTHER PUBLICATIONS

Wang et al: "Filtermeidum und dessen Auswahl"; China Textile & Apparel Press; ISBN: 978-7-5064-4854-3; 2008; May 31, 2008.

* cited by examiner

*Primary Examiner* — Jason M Greene
*Assistant Examiner* — Karla Hawkins

(57) ABSTRACT

A fluidizing plate is provided. The fluidizing plate generates a fluidization layer accommodating a dustlike bulk material, having a high operating temperature range and high permissible differential pressure relative to the thickness of the fluidizing plate, a support plate which carries the filter material and has through holes. Particular designs of the filter material feature metallic filtration fabric with or without support fabric, sintered metal, and sintered plastic, in each case with a filter fineness of 5 μm to 1000 μm. Particular designs of the fluidizing plate feature the disposition of a central through hole for the shaft of a stirrer mechanism, and an opening for the emptying of the fluidization vessel.

13 Claims, 2 Drawing Sheets

MODIFIED FLUIDIZING PLATE FOR USE IN GASIFICATION PLANTS WITH DRY FUEL FEED

CROSS REFERENCE TO RELATED APPLICATIONS

The present application claims priority to German application No. 102012216084.1 DE filed Sep. 11, 2012, the entire content of which is hereby incorporated herein by reference.

FIELD OF INVENTION

The invention relates to a fluidizing plate for generating a fluidization layer in a fluidization vessel accommodating a dustlike bulk material, having a high operating temperature range and high permissible differential pressure relative to the thickness of the fluidizing plate.

BACKGROUND OF INVENTION

In entrained-flow gasification, the feedstock to be gasified is held in a system called the feed system. From a reservoir vessel, also referred to as the feeder or fluidization vessel, and subject to a pressure for example of 4 MPa, the dustlike fuel (e.g., coal dust) is supplied via conveying lines to the burner. These conveying lines connect vertically from above into the bottom region of the reservoir vessel. The fuel is therefore conveyed from bottom to top. Stable, pulsation-free fuel dust conveying via the conveying line is critical to the optimum operation of the gasification plant. Stable conveying requires the bed of fuel to have an optimum density, known as the fluidization density, before entry into the conveying lines. If this requirement is not met, there may be severe disruptions to conveying.

As already outlined above, the attainment of an optimum fluidization density is a fundamental requirement for optimum, disruption-free fuel conveying. The fluidization density is set by way of the uniform addition of gas known as fluidizing gas, which may take the form of an inert gas such as nitrogen or carbon dioxide, for example, to the reservoir vessel from below. The addition of this gas leads to a reduction in the bulk density of the fuel. This means that more or less fluidizing gas is supplied, according to the requisite fluidization density. Uniform fluidization of the fuel over the entire area of the vessel base is critical to disruption-free conveying of the fuel drawn off from this fluidized layer. The uniformly distributed supply of the fluidizing gas has to date been ensured by means of a plate made of synthetic-resin-bonded pebble filter.

By virtue of its porosity, this material presents a very low flow resistance. At the same time, the porosity is correspondingly low, but is also selected to be small, in order to prevent fuel particles penetrating the filter and/or the gas supply line. In view of the physical properties of the sand filter, the maximum differential pressure is limited to levels permissible correspondingly by this element and/or by the maximum tensioning gas temperature. This limitation on the differential pressure and/or on the temperature does not normally pose any problems in plant operation. Exceedance of these parameters as a result of incorrect operating measures, such as shutoff of the fluidizing gas, which can lead to the maximum permissible differential pressure being exceeded, or the maximum permissible fluidizing gas temperature being exceeded, is accompanied by damage to the synthetic-resin-bonded pebble filter. Damage to this fluidizing plate, as it is called, may have the consequence of poor fluidizing gas distribution. This in turn leads to a situation in which the fluidization density required for stable conveying is unattainable at sites of relatively low fluidizing gas supply.

Exceeding the design parameters (differential pressure, temperature) can lead to damage to the pebble filter. Reducing the thickness of the filter material results in a reduction in the maximum permissible differential pressure. The maximum permissible differential pressure, however, is likewise an important design criterion for the element.

SUMMARY OF INVENTION

The problem addressed by the invention is that of specifying a fluidizing plate for the supply of fluidizing gas into the dustlike bulk material in a reservoir vessel, where the parameters of thickness of the fluidizing plate, and especially of the filter material, high admissible differential pressure, and level of the admissible operating temperature attain a new optimum.

The problem is solved by an article having the features of the claims.

The starting point of the invention is that a more robust design than in the conventional sand filter is needed in order to avoid instances of damage to the filter element. As already mentioned, the physical properties of the sand filter constitute a limiting factor. For this reason, a design of the element with more temperature-resistant materials is envisaged.

Advantages afforded by the invention are the construction of a fluidizing plate with high temperature resistance and increased permissible differential pressure in conjunction with effective distribution of the gas over the area of the fluidizing plate. As far as the construction of the element is concerned, it is largely possible to employ standard materials, and this leads to a reduction in the manufacturing costs. The higher service life of the fluidizing plate, anticipated as a result of the constructional design, contributes critically to increasing the availability of the overall feed system.

Advantageous developments of the invention are specified in the dependent claims.

BRIEF DESCRIPTION OF THE DRAWINGS

The invention is elucidated in more detail below, as an exemplary embodiment, to an extent required for understanding, using figures, where.

In the figures, identical references denote identical elements.

DETAILED DESCRIPTION OF INVENTION

Figure 1:
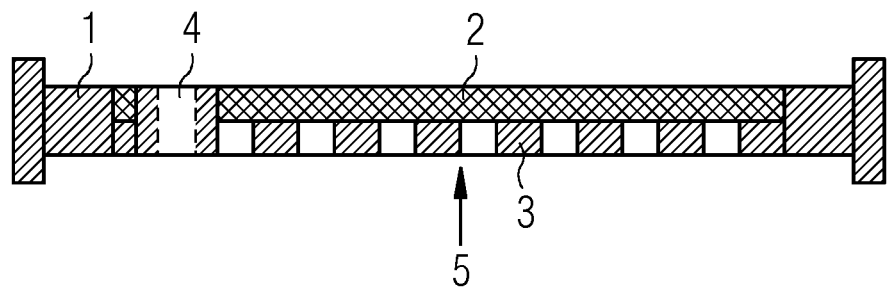
FIG. 1 shows a side view of a fluidizing plate of the invention, at the top without stirrer mechanism and at the bottom with stirrer mechanism.
Figure 1:
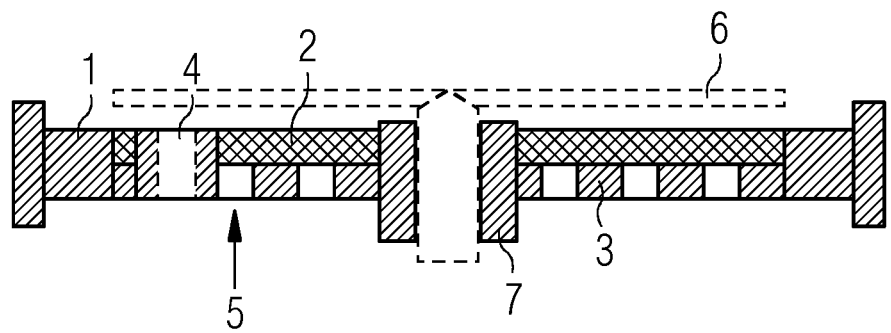
Figure 2:
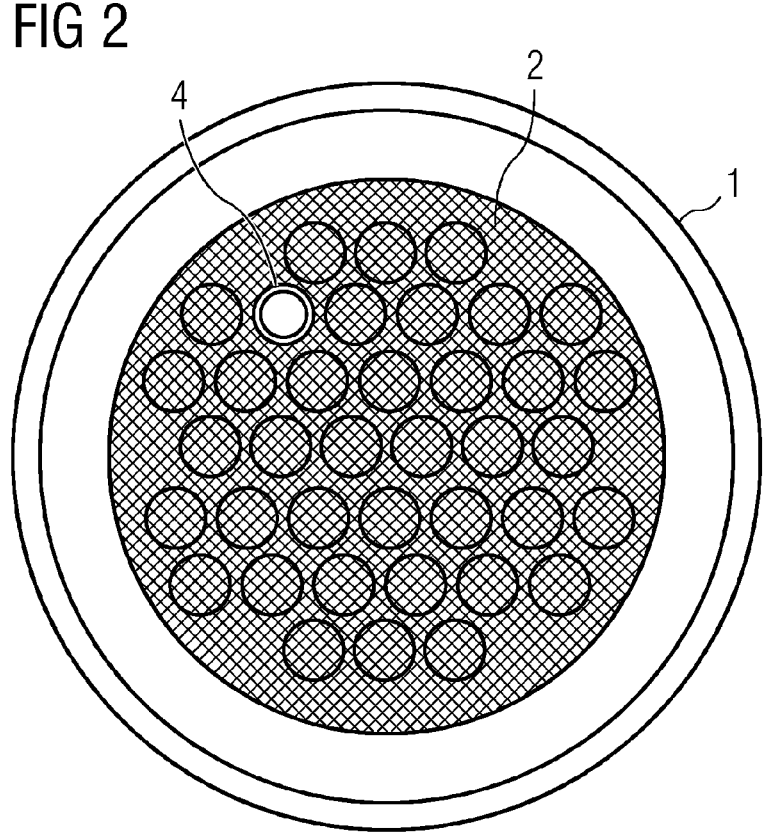
FIG. 2 shows a front view of the fluidizing plate of the invention, at the top without stirrer mechanism and at the bottom with stirrer mechanism.
Figure 2:
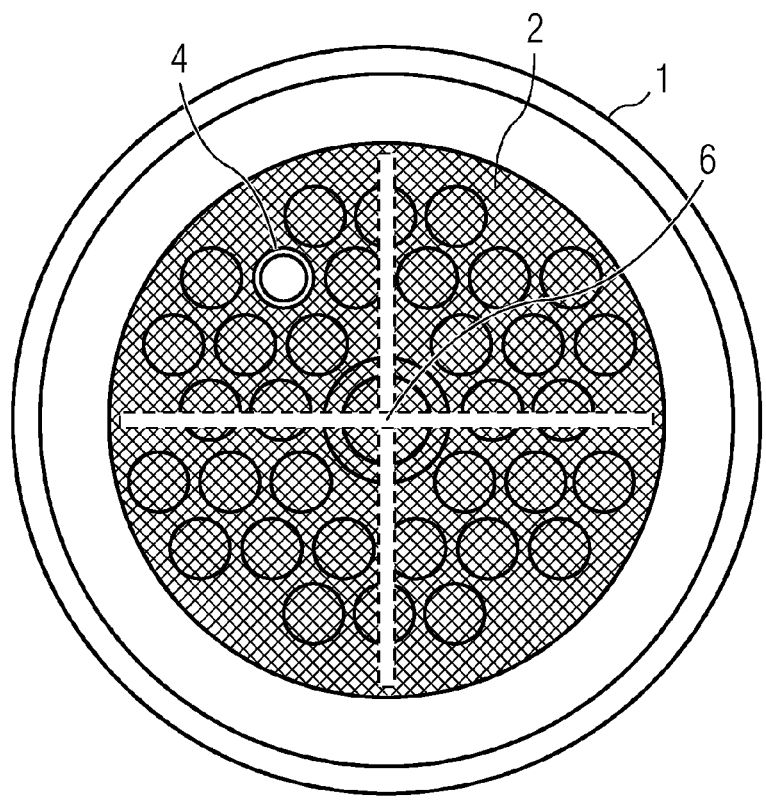

The fluidizing plate shown in FIG. 1, which to the bottom defines the space for stocking a bulk material in a reservoir vessel, has an accommodating ring 1. The accommodating ring carries a support plate 3 which has through holes/apertures and on which a filter material is applied. The filter material is selected according to the required filter fineness, the prerequisite for a minimal flow resistance and for protection from backflowing fuel dust. This filter material, configured with the appropriate filter fineness, should be designed to be insensitive to the maximum possible tensioning gas temperatures. In order to keep the flow pressure drop low, the filter material should be selected with as low as possible a thickness. In order to achieve a high permissible differential pressure, the filter material is reinforced on one side through use of a support plate 3, which is disposed beneath the filter material. As a result of the uniform distribution of the recesses in the material, by way of the support plate mounted on one side, it is possible—in analogy to the pebble filter version—to ensure a uniformly distributed supply of gas into the reservoir vessel.

For the envisaged service conditions of the fluidizing plate, the following configurations are possible for the filter material 2:
metallic filtration fabric with or without support fabric [filter fineness: 5 μm to 1000 μm]
sintered metal [filter fineness: 5 μm to 1000 μm]
sintered plastic [filter fineness: 5 μm to 1000 μm]

The plate which supports the filter material on one side from below, identified as support plate 3 in the description above, preferably has the following structural features:

Recess/plate material ratio by area: 0.15 to 0.70 [a smaller or larger ratio by area would lead to structural problems with the element, owing to the requirement for a minimum loosening area, at the same time as ensuring the required strength.]

Shape of the apertures present in the plate:

The apertures to be made in the plate are preferably distributed symmetrically over the area of the element. The shape of the apertures may be flexible but may also be of any desired design. The critical factor is compliance with the stated ratio by area. Accordingly, for example, circular or slitted apertures are possible.

A prerequisite for equal distribution of the fluidizing gas over the entire area of the fluidizing plate is a minimum pressure drop to be occasioned/applied by the fluidizing plate. In other words, beneath the fluidizing plate (i.e., on the flow impingement side), the pressure must be about 10 mbar above the pressure on the flow exit side.

An opening 4 for the emptying of the reservoir vessel may be disposed in the fluidizing plate, this opening passing through both the filter material and the support plate, and being closable.

A central passage 7 for the shaft of a stirrer mechanism 6 may be disposed in the fluidizing plate, this passage passing through both the filter material and the support plate.

We claim:

1. A fluidizing plate for generating a fluidization layer in a fluidization vessel accommodating a dustlike bulk material, having a high operating temperature range and high permissible differential pressure relative to the thickness of the fluidizing plate, the fluidizing plate comprising:
   a filter material traversed by a flow of fluidizing gas; and
   a support plate with through holes disposed on the lower side, facing away from the bulk material, of the filter material,
   wherein the ratio by area of through holes to material of the support plate is 0.15 to 0.70, and
   wherein the fluidizing plate is designed for a pressure drop from the flow impingement side to the flow exit side of approximately 10 mbar.

2. The fluidizing plate as claimed in claim 1,
   wherein the filter material comprises a metallic filtration fabric.

3. The fluidizing plate as claimed in claim 2,
   wherein the metallic filtration fabric comprises a support fabric.

4. The fluidizing plate as claimed in claim 1,
   wherein the filter material comprises a sintered metal.

5. The fluidizing plate as claimed in claim 1,
   wherein the filter material comprises sintered plastic.

6. The fluidizing plate as claimed in claim 1,
   wherein the filter material has a filter fineness of 5 μm to 1000 μm.

7. The fluidizing plate as claimed in claim 1,
   wherein the through holes are uniformly distributed.

8. The fluidizing plate as claimed in claim 1,
   wherein the through holes have a circular form.

9. The fluidizing plate as claimed in claim 1,
   wherein the apertures are slitted.

10. The fluidizing plate as claimed in claim 1,
    wherein a round cross section in plan view.

11. The fluidizing plate as claimed in claim 1,
    wherein a central passage for a stirring mechanism.

12. The fluidizing plate as claimed in claim 1,
    wherein a closable opening traversing the fluidizing plate and intended for emptying of the fluidization vessel.

13. The fluidizing plate as claimed in claim 1,
    wherein the mounting of the support plate in an accommodating ring which can be connected to the fluidization vessel.

* * * * *